(12) United States Patent
Pakyari et al.

(10) Patent No.: US 8,918,509 B1
(45) Date of Patent: Dec. 23, 2014

(54) DYNAMIC ARBITRARY DATA SIMULATION USING FIXED RESOURCES

(75) Inventors: Alireza Pakyari, Lexington, MA (US); Marc David Erickson, Natick, MA (US); Brian K. Ogilvie, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 400 days.

(21) Appl. No.: 13/331,070

(22) Filed: Dec. 20, 2011

(51) Int. Cl.
*G06F 15/16* (2006.01)

(52) U.S. Cl.
USPC ........... 709/226; 709/201; 709/203; 709/223; 709/224

(58) Field of Classification Search
USPC .................. 709/203, 205, 223, 226
See application file for complete search history.

(56) References Cited

U.S. PATENT DOCUMENTS

| | | | |
|---|---|---|---|
| 7,275,026 B2 | 9/2007 | Mani et al. | 703/13 |
| 7,454,659 B1 * | 11/2008 | Gaudette et al. | 714/33 |
| 7,882,462 B2 | 2/2011 | Ogilvie et al. | 716/3 |
| 2005/0033809 A1 * | 2/2005 | McCarthy et al. | 709/205 |
| 2007/0025381 A1 * | 2/2007 | Feng et al. | 370/431 |
| 2008/0021951 A1 * | 1/2008 | Lurie et al. | 709/202 |
| 2008/0189718 A1 * | 8/2008 | Gulley et al. | 718/107 |
| 2008/0189719 A1 * | 8/2008 | Shimizuno | 719/312 |
| 2009/0132867 A1 * | 5/2009 | Stefansson et al. | 714/49 |
| 2010/0223385 A1 * | 9/2010 | Gulley et al. | 709/226 |

* cited by examiner

*Primary Examiner* — Hamza Algibhah
*Assistant Examiner* — Natisha Cox
(74) *Attorney, Agent, or Firm* — Harrity & Harrity, LLP

(57) ABSTRACT

A device determines a portion of data generated by a technical computing environment (TCE) program, where the portion of the data is determined based on an initial availability of a resource of a server device. The device provides the portion of the data to the server device for execution, and receives, from the server device, results associated with execution of the portion of the data. The device calculates an availability of the resource based on the results associated with execution of the portion of the data, and provides, to the server device for execution, additional data generated by the TCE program, where the additional data is determined based on the availability of the resource of the server device. The device receives, from the server device, results associated with execution of the additional data, where the receiving is performed by the device.

30 Claims, 9 Drawing Sheets

DYNAMIC ARBITRARY DATA SIMULATION
USING FIXED RESOURCES

BACKGROUND

In certain applications, engineers may wish to simulate a system, e.g., a communication system, prior to constructing the actual system. Simulations may allow engineers to model aspects of the communication system before expending time, money, and other resources to actually construct the system. For example, an engineer may use a computing environment to create a model for the communication system that includes array, matrix, and/or vector formulations. The engineer may attempt to execute the model on a hardware resource (e.g., a central processing unit (CPU), a graphical processing unit (GPU), a field-programmable gate array (FPGA), etc.). The model may utilize data (e.g., arbitrary vector size data, arbitrary matrix size data, etc.) to execute on the hardware resource.

During model execution, the computing environment may attempt to execute the model more quickly on the hardware resource by batching the data together and by sending the batched data together to the hardware resource for execution. However, the hardware resource may not be able to handle the batched data due to limited resources (e.g., limited buffer sizes). Increasing the hardware resources during execution of the model may not be feasible.

In such a situation, the computing environment is unable to provide arbitrary size data to one or more hardware resources for execution, without recompiling and/or re-synthesizing the model. Furthermore, recompiling and/or re-synthesizing the model are time consuming and expensive processes.

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may provide a mechanism to send arbitrarily sized data (e.g., arbitrary vector size data, arbitrary matrix size data, etc.), associated with a model or a design, from a client device (e.g., executing a technical computing environment (TCE)) to one or more server devices (e.g., a CPU, a GPU, a FPGA, etc.) without recompiling or re-synthesizing the model at the client device. The systems and/or methods may enable this by keeping the model fixed and by dynamically utilizing resources in the server device via the client device. The systems and/or methods may enable a user (e.g., of the client device) to synthesize the model and to dynamically change the size of the data for the model during simulation by the server device, without having to recompile or re-synthesize the model at the client device. For example, the systems and/or methods may provide portions of TCE data for processing by the service device based on the availability of the resources in the server device.

The terms a "portion" or a "portion of TCE data," as used herein, are to be broadly interpreted to include all of the TCE data, contiguous portions of TCE data, and/or non-contiguous portions of TCE data.

Example Network Arrangement

Figure 1:
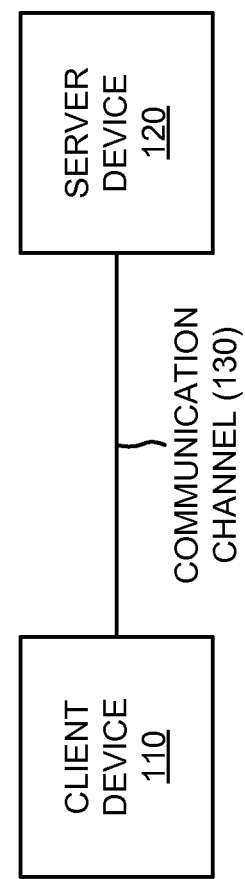
FIG. 1 is a diagram of an example system in which concepts described herein may be implemented.

FIG. 1 is a diagram of an example system 100 in which concepts described herein may be implemented. As illustrated, system 100 may include a client device 110 interconnected with a server device 120 via a communication channel 130. Components of system 100 may interconnect via wired and/or wireless connections. A single client device 110, server device 120, and communication channel 130 have been illustrated in FIG. 1 for simplicity. In practice, system 100 may include more client devices 110, server devices 120, and/or communication channels 130. In one example implementation, server device 120 may correspond to hardware (e.g., a CPU, a GPU, a FPGA, application-specific integrated circuit (ASIC), etc.) or software (e.g., a simulator executing on hardware). Client device 110 and server device 120 may be provided in a single device or may be provided in separate devices.

Client device 110 may include one or more devices that are capable of communicating with server device 120 via communication channel 130. For example, client device 110 may include a laptop computer, a personal computer, a tablet computer, a desktop computer, a workstation computer, a smart phone, a personal digital assistant (PDA), and/or other computation and communication devices.

In one example implementation, client device 110 may receive or generate program code and data created using a TCE (e.g., provided in client device 110 or another device). The program code may include executable code provided by the TCE, such as, for example, a programming file (e.g., a bit file), a binary file, etc. The data may include arbitrarily sized data, such as, for example, arbitrary vector size data, arbitrary matrix size data, etc. Client device 110 may transfer portions of the TCE data and the program code to server device 120, and server device 120 may execute the portions of the TCE data and/or the program code. The transferred portions of the TCE data and/or the program code may be sized so that resources of server device 120 and/or communication channel 130 may handle the transferred portions. Sizes associated with the transferred portions of the TCE data and/or the program code may be varied by client device 110 depending upon the resource availability at server device 120. Thus, client device 110 may not depend on communication channel 130 capabilities and/or the size of the transferred portions of the TCE data and/or the program code.

Server device 120 may include one or more server devices, or other types of computation and communication devices, that gather, process, and/or provide information in a manner described herein. Server device 120 may include a device that is capable of communicating with client device 110 (e.g., via communication channel 130). In one example, server device 120 may include one or more laptop computers, personal computers, workstation computers, servers, CPUs, GPUs, FPGAs, ASICs, etc. and/or software (e.g., a simulator) executing on the aforementioned devices.

Communication channel 130 may include a mechanism to enable an exchange of information between client device 110 and server device 120. For example, communication channel 130 may include an Ethernet based communication channel, a Peripheral Component Interconnect (PCI) communication channel, a PCI Express (PCIe) communication channel, a universal asynchronous receiver/transmitter (UART) based communication channel, etc. Alternatively, or additionally, communication channel 130 may include a network, such as a local area network (LAN), a wide area network (WAN), a metropolitan area network (MAN), a telephone network, such as the Public Switched Telephone Network (PSTN), an intranet, the Internet, or a combination of networks.

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more other tasks described as being performed by one or more other components of system 100.

Example Device Architecture

Figure 2:
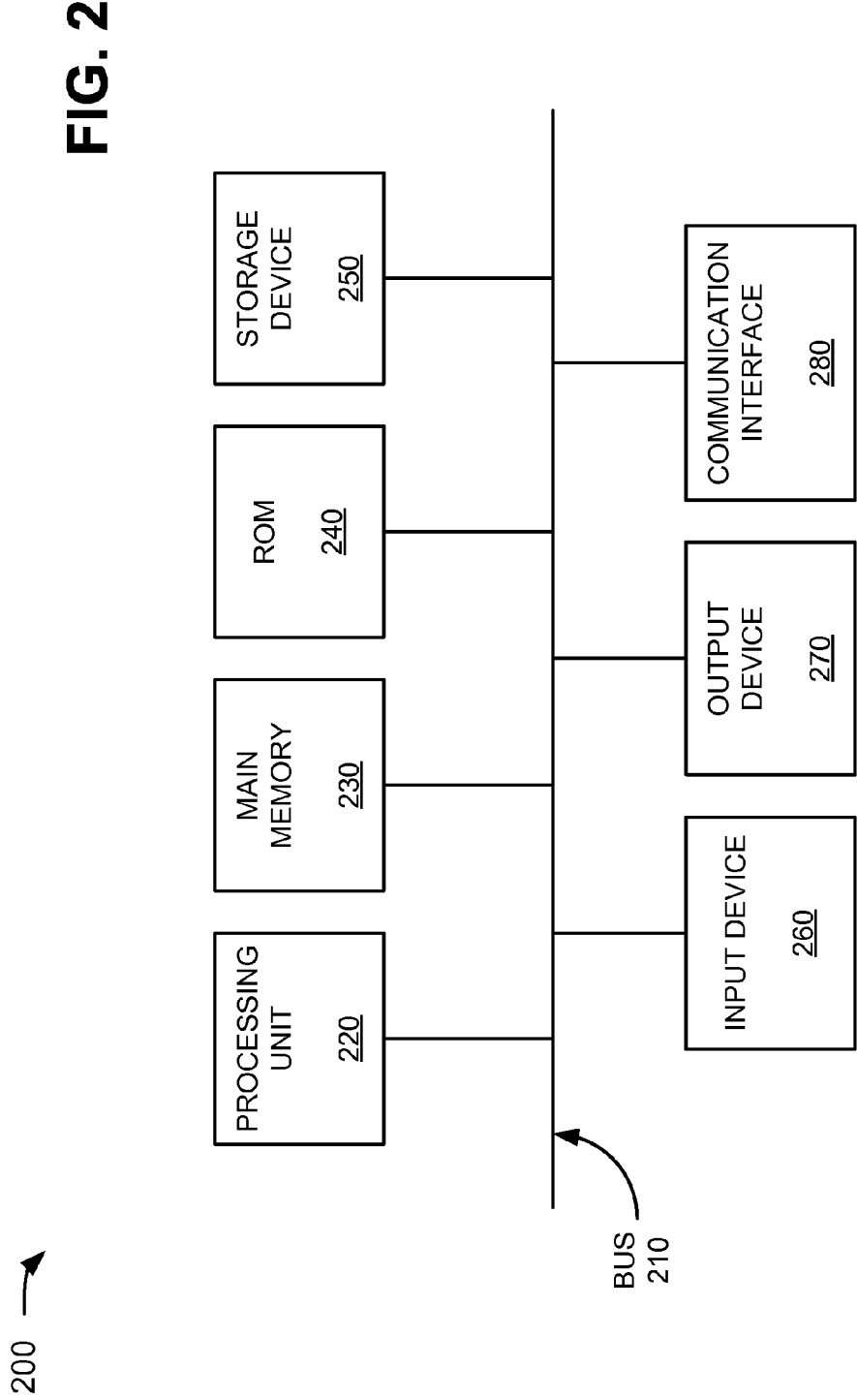
FIG. 2 is a diagram of example components of one or more of the devices of the network depicted in FIG. 1.

FIG. 2 is an example diagram of a device 200 that may correspond to one or more of the devices of system 100. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits a user to input information to device 200, such as a keyboard, a mouse, a pen, a microphone, voice recognition and/or biometric mechanisms, a remote control, a touch screen, etc. Output device 270 may include a mechanism that outputs information to the user, including a display, a printer, a speaker, etc. Communication interface 280 may include any transceiver-like mechanism that enables device 200 to communicate with other devices, networks, and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, and/or additional components than depicted in FIG. 2. Alternatively, or additionally, one or more components of device 200 may perform one or more other tasks described as being performed by one or more other components of device 200.

Example Device Components

Figure 3:
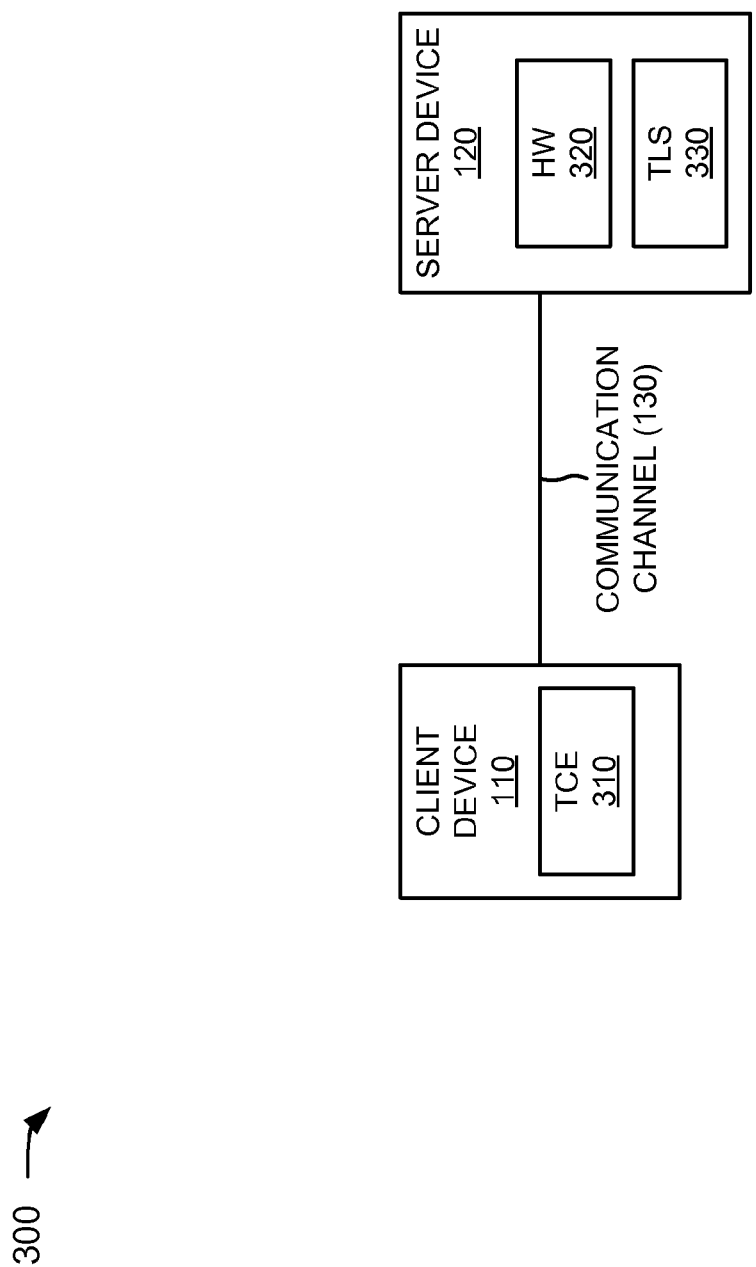
FIG. 3 is a diagram of example components of devices of the system depicted in FIG. 1.

FIG. 3 is a diagram of example components 300 of devices of system 100 (FIG. 1). As illustrated, client device 110 may include a TCE 310, and server device 120 may include hardware (HW) 320 and a transaction level simulator (TLS) 330. As further shown, client device 110 may interconnect with server device 120 via communication channel 130. Client device 110, server device 120, and communication channel 130 may include the features described above in connection with, for example, one or more of FIGS. 1 and 2.

TCE 310 may be provided within a computer-readable medium of client device 110 (e.g., in ROM 240 and/or storage device 250). Alternatively, or additionally, TCE 310 may be provided in another device that is accessible by client device 110 (e.g., via communication interface 280). TCE 310 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 310 may include a dynamically-typed programming language (e.g., the M language, a MATLAB® language, a MATLAB-compatible language, a MATLAB-like language, etc.) that can be used to express problems and/or solutions in mathematical notations. For example, TCE 310 may use an array as a basic element, where the array may not require dimensioning. In addition, TCE 310 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 310 may further provide mathematical functions and/or graphical tools (e.g., for creating plots, surfaces, images, volumetric representations, etc.). In one implementation, TCE 310 may provide these functions and/or tools using toolboxes (e.g., toolboxes for signal processing, image processing, data plotting, parallel processing, etc.). Alternatively, or additionally, TCE 310 may provide these functions as block sets or in another way, such as via a library, etc.

TCE 310 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

Hardware 320 may include any type of hardware capable of executing or processing data provided by TCE 310. For example, hardware 320 may include an embedded processor, a CPU, a GPU, a FPGA, an ASIC, etc. The CPU may include one or more processors, microprocessors, or other types of processing units that may interpret and execute instructions. The GPU may include one or more specialized microprocessors that offload and accelerate three-dimensional or two-dimensional processing, such as graphics rendering, from a microprocessor. The GPU may include a highly parallel structure that makes the GPU more effective than general-purpose CPUs for interacting with and/or operating on a range of complex algorithms. The FPGA may include an integrated circuit designed to be configured by a customer or a designer after manufacturing. The ASIC may include an integrated circuit that is customized for a particular use, rather than intended for general-purpose use.

Transaction level simulator 330 may include software that executes outside of TCE 310 and performs simulations using data and/or program code generated by TCE 310. In one example implementation, transaction level simulator 330 may be executed by hardware 320, or may be omitted from server device 120.

Client device 110 and server device 120 may implement a protocol, over communication channel 130, to exchange: arbitrarily sized data (e.g., arbitrary vector size data, arbitrary matrix size data, etc.); a number cycles to execute in a simulation; commands (e.g., a reset command, a run command, etc.); status information (e.g., a status of hardware 320, a status of transaction level simulator 330, etc.); and other information. The protocol may prevent overflows or underflows of memory in client device 110 and/or server device 120. The protocol may provide a mechanism to initiate a communication between client device 110 and server device 120, may check if the communication is established, may check if hardware 320 and/or transaction level simulator 330 are ready to receive data, etc. In one example, the protocol may not be limited to use with TCE 310, but rather may provide a mechanism to connect two entities and pass status information, commands, and/or data. Thus, the protocol may enable one entity to control another entity in a master-slave situation. For example, client device 110 may include an embedded processor and client device 110 may act as a master entity, and hardware 320 may include a FPGA and may act as a slave entity. In another example, TCE 310 may be a master entity, and hardware 320 may include an embedded processor that acts as a slave entity.

Although FIG. 3 shows example components of devices of system 100, in other implementations, devices of system 100 may include fewer component, different components, differently arranged components, and/or additional components than depicted in FIG. 3. Alternatively, or additionally, one or more components of the devices of system 100 may perform one or more other tasks described as being performed by one or more other components of the devices of system 100.

Example Technical Computing Environment

Figure 4:
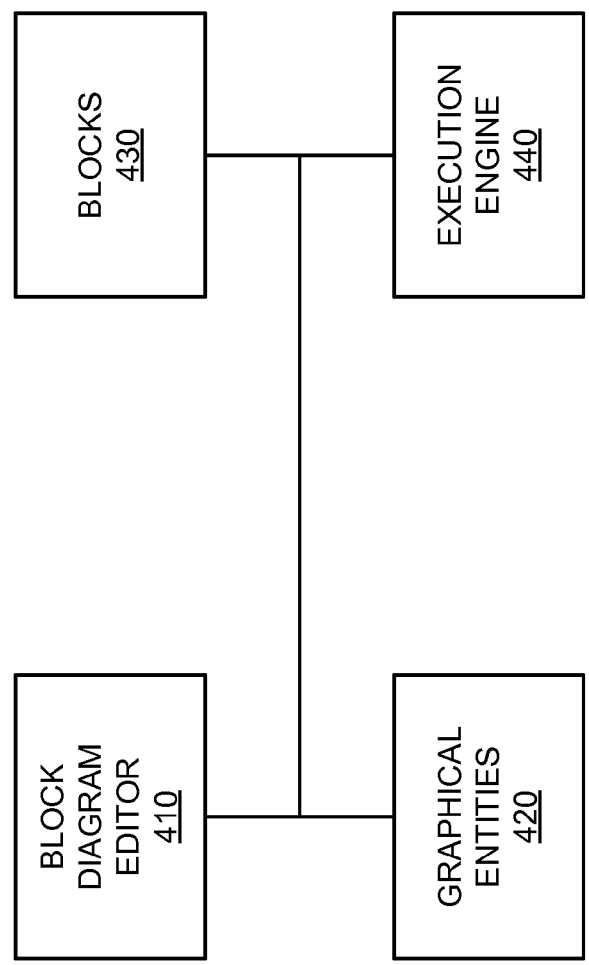
FIG. 4 is a diagram of example functional components of a technical computing environment that may be used by a client device of FIGS. 1 and 3.

FIG. 4 is a diagram of example functional components TCE 310. In one implementation, the functions described in connection with FIG. 4 may be performed by one or more components of device 200 (FIG. 2) and/or by one or more devices 200. As shown in FIG. 4, TCE 310 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 110) to implement the functionality specified by the model. Further details of execution engine 440 are provided below in connection with, for example, FIGS. 5 and 6.

Although FIG. 4 shows example functional components of TCE 310, in other implementations, TCE 310 may include fewer functional components, different functional components, differently arranged functional components, and/or additional functional components than depicted in FIG. 4. Alternatively, or additionally, one or more functional components of TCE 310 may perform one or more other tasks described as being performed by one or more other functional components of TCE 310.

Example System Interactions

Figure 5:
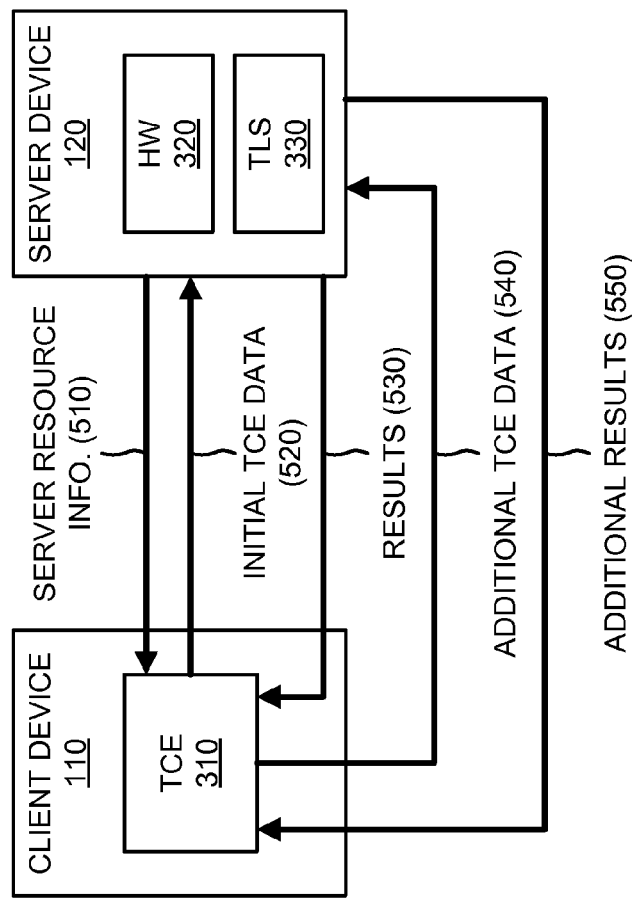
FIG. 5 is a diagram of example interactions between devices of an example portion of the system depicted in FIG. 1.

FIG. 5 is a diagram of example interactions between devices of an example portion 500 of system 100 (FIG. 1). As illustrated, example system portion 500 may include client device 110, server device 120, TCE 310, hardware 320, and transaction level simulator 330. Client device 110, server device 120, TCE 310, hardware 320, and transaction level simulator 330 may include the features described above in connection with, for example, one or more of FIGS. 1-4.

Although not shown in FIG. 5, client device 110 may receive or generate data created using TCE 310 or a TCE 310 model. The data may include arbitrarily sized data, such as, for example, arbitrary sized vector data, arbitrary sized matrix data, etc. that may be changed, for example, during execution of a TCE 310 model by server device 120. In one example, the data may include frames and/or system objects received or generated by TCE 310. A frame may include a collection of data samples acquired over time. The collection of data samples may have periodic sampling interval (i.e., uniformly sampled over time) or may be aperiodic with respect to the sampling interval (i.e., non-uniformly sampled over time). A temporal collection may be referred to as a frame of data samples. A system object may include an object that maintains state, and thus an output of the system object may depend on the state of the system object. A system object many not have to be reinitialized with an initial state from one call to the system object to another call to the system object since the system object can maintain state. A system object may be useful in, for example, filtering applications since real world filters maintain a state and a filtered output is a function of the input to the filter and the state of the filter.

As shown in FIG. 5, server device 120 may provide, to client device 110/TCE 310, information 510 associated with a resource (e.g., hardware 320 and/or transaction level simulator 330) of server device 120. Information 510 may indicate and/or include a capacity of hardware 320, a percent utilization of hardware 320, a capacity of transaction level simulator 330, a percent utilization of transaction level simulator 330, etc. Client device 110/TCE 310 may receive information 510, and may calculate resource availability based on information 510.

Client device 110/TCE 310 may determine an amount of initial TCE data 520 based on the resource availability. For example, if information 510 indicates that zero percent of hardware 320 is being utilized, client device 110/TCE 310 may determine that the hardware has one-hundred percent availability (i.e., is fully available). Client device 110/TCE 310 may then determine what initial amount 520 of the TCE data may be handled by the fully available hardware 320. As further shown in FIG. 5, client device 110/TCE 310 may provide initial amount 520 of the TCE data, via one or more different sized packets, to server device 120 for executing or processing by hardware 320 and/or transaction level simulator 330. The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data. Server device 120 may receive initial amount 520 of the TCE data, and may serialize initial amount 520 of the TCE data. Hardware 320 and/or transaction level simulator 330 may execute or process initial amount 520 of the TCE data to generate results 530 associated with executing or processing initial amount 520 of the TCE data. Server device 120 may provide results 530 to client device 110/TCE 310.

Client device 110/TCE 310 may receive, from server device 120, results 530 associated with executing or processing initial amount 520 of the TCE data, and may recalculate the resource availability based on results 530. Client device 110/TCE 310 may determine whether there is additional TCE data 540 to provide to server device 120 for executing or processing. If client device 110/TCE 310 determines that there is additional TCE data 540, client device 110/TCE 310 may provide additional TCE data 540 to server device 120 for executing or processing by hardware 320 and/or transaction level simulator 330. Server device 120 may receive additional TCE data 540, and hardware 320 and/or transaction level simulator 330 may execute or process additional TCE data 540 to generate additional results 550 associated with executing or processing additional TCE data 540. Server device 120 may provide additional results 550 to client device 110/TCE 310.

Client device 110/TCE 310 may receive, from server device 120, additional results 550 associated with executing or processing additional TCE data 540. Client device 110/TCE 310 may recalculate the resource availability based on additional results 550, and may repeat the aforementioned process until there is no more additional TCE data.

In one example implementation, system portion 500 may enable unlimited data transfer from client device 110/TCE 310 to server device 120. In order to support unlimited data transfer, in each step of a simulation by TCE 310, an optimized memory partitioning may be implemented between client device 110/TCE 310 and server device 120. For example, if hardware 320 and/or transaction level simulator 330 have limited memory resources, system portion 500 may utilize memory resources of client device 110/TCE 310 to ensure that hardware 320 and/or transaction level simulator 330 are not overloaded with data.

Alternatively, or additionally, to be able to support single-rate and multi-rate simulation subsystems generated by TCE 310, system portion 500 may define a temporal relation between client device 110/TCE 310 base sample time and server device 120 clock period (e.g., where the temporal relation=base sample time/clock period). For example, TCE 310 may define a simulation subsystem with N inputs and M outputs, where each input may receive data periodically and may generate data at an output periodically. If a periodicity or a burst rate of the inputs and the outputs are equal, then the simulation subsystem may be considered a single-rate simulation subsystem, otherwise the simulation subsystem may be considered a multi-rate simulation subsystem. For example, if the simulation subsystem has two inputs and one output, and once every second the simulation subsystem receives new data at the two inputs and generates data each second at the output, then the simulation subsystem may be considered a single rate simulation subsystem. However, if the simulation subsystem receives data at a first input every two seconds and at a second input every three seconds then the simulation subsystem may be considered a multi-rate simulation subsystem. The output periodicity may be two seconds, three seconds, or any other value. An input base sample time of a multi-rate simulation subsystem may be a greatest common divisor (GCD) of the inputs' sample times. In the above example, the base rate may be one second.

TCE 310 may call each simulation subsystem during a simulation. Each simulation subsystem may process an input value, if there is any change or when there is no change, and may produce an output. However, this may be an inefficient way to use communication channel 130 between TCE 310 and server device 120. Instead, client device 110/TCE 310 may calculate a next sample hit (e.g., at a time when there is a change at the input), and may request that server device 120 execute the next sample hit at that time.

For example, if the input sample times are three and five seconds, respectively, then new data may occur at times [0, 3, 5, 6, 9, 10, 12, 15 . . . ] seconds. During the simulation, client device 110/TCE 310 may send new data at times [0, 3, 5, 6, 9, 10, 12, 15 . . . ], and may cause server device 120 to execute at clock cycles (e.g., a number of cycles) of [3N, 2N, 1N, 3N, 1N, 2N, 3N], where N=base sample time/clock period. A minimum output sample time may be calculated by dividing the input base sample time by N, where N=base sample time/clock period. Each base simulation step may equal N*clock cycles, where a base step is a minimum step in the simulation.

Although FIG. 5 shows example components of system portion 500, in other implementations, system portion 500 may include fewer components, different components, differently arranged components, and/or additional components than depicted in FIG. 5. Alternatively, or additionally, one or more components of system portion 500 may perform one or more other tasks described as being performed by one or more other components of system portion 500.

Example System Configurations

Figure 6:
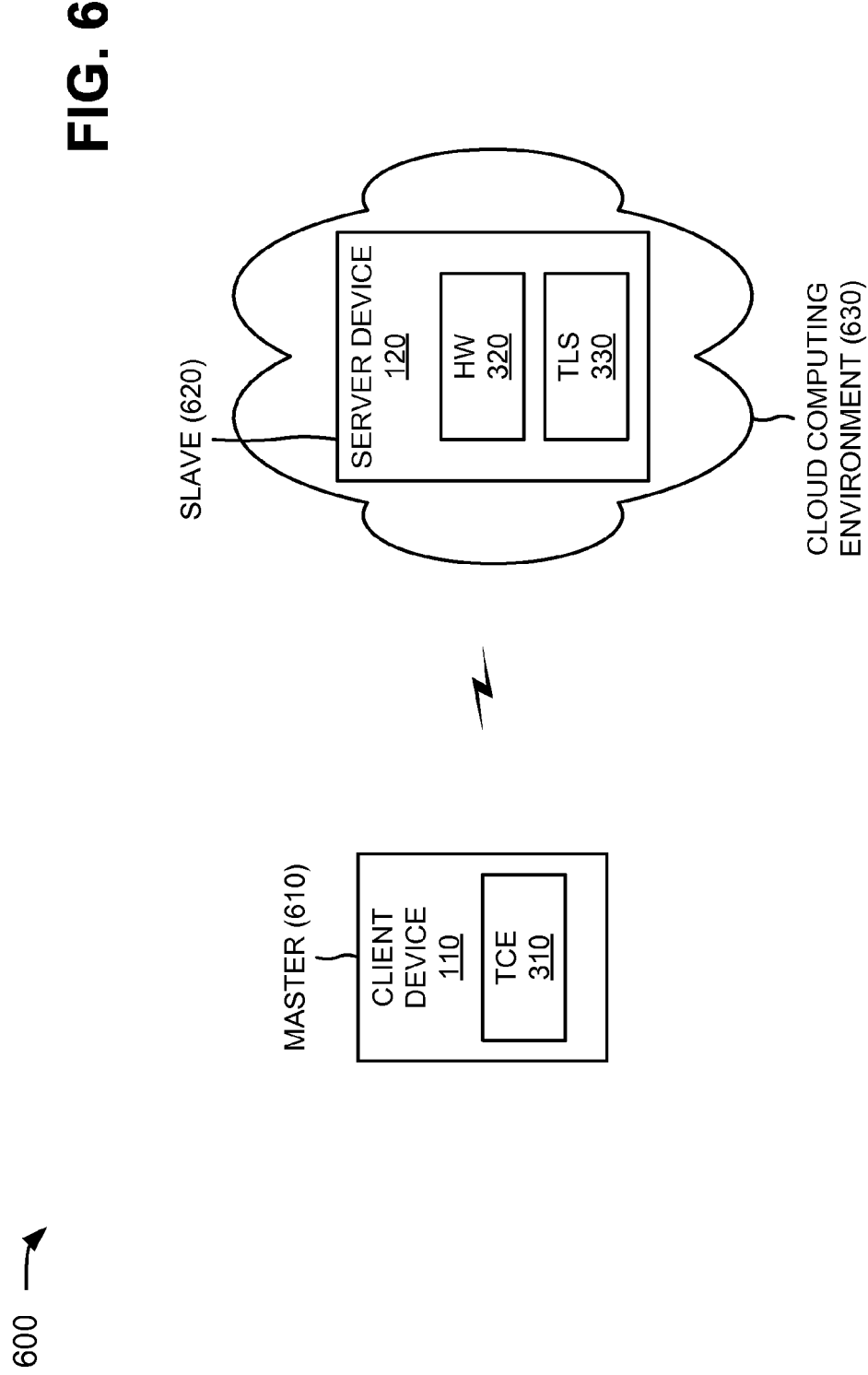
FIG. 6 is a diagram of another example system in which concepts described herein may be implemented.

FIG. 6 is a diagram of another example system 600 in which concepts described herein may be implemented. As shown, system 600 may include client device 110, server device 120, TCE 310, hardware 320, and transaction level simulator 330. Client device 110, server device 120, TCE 310, hardware 320, and transaction level simulator 330 may include the features described above in connection with, for example, one or more of FIGS. 1-5. Components of system 600 may interconnect via wired and/or wireless connections. A single client device 110, server device 120, TCE 310, hardware 320, and transaction level simulator 330 have been illustrated in FIG. 6 for simplicity. In practice, system 600 may include more client devices 110, server devices 120, TCEs 310, hardware 320, and/or transaction level simulators 330.

As further shown in FIG. 6, client device 110/TCE 310 may be considered a master device 610 and server device 120, hardware 320, and/or transaction level simulator 330 may be considered a slave device 620. In one example implementation, master device 610 and slave device 620 may not be physically located in a same place. For example, master device 610 may be located in one location, and slave device 620 may be located in another, different location, such as in a cloud computing environment 630. Cloud computing environment 630 may include an environment that delivers computing as a service rather than as a product, whereby shared resources, software, and information may be provided to master device 610 as a utility over a network. Cloud computing environment 630 may provide computation, software, data access, and/or storage services that do not require end-user (e.g., master device 610) knowledge of a physical location and configuration of a system (e.g., slave device 620) that delivers the services.

Although FIG. 6 shows example components of system 600, in other implementations, system 600 may include fewer components, different components, differently arranged components, and/or additional components than those depicted in FIG. 6. Alternatively, or additionally, one or more components of system 600 may perform one or more other tasks described as being performed by one or more other components of system 600.

Figure 7:
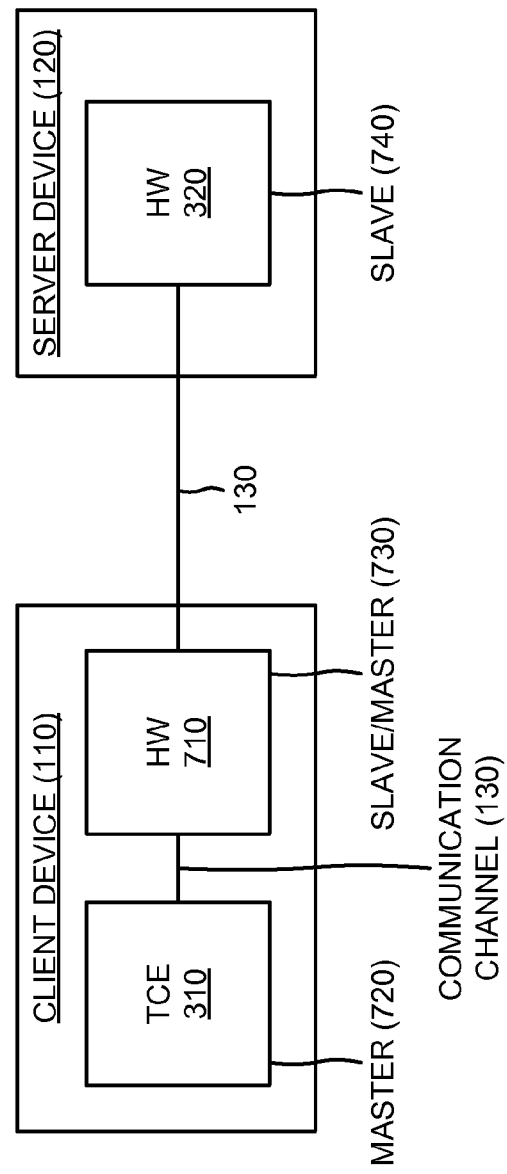
FIG. 7 is a diagram of still another example system in which concepts described herein may be implemented.

FIG. 7 is a diagram of still another example system 700 in which concepts described herein may be implemented. As shown, system 700 may include client device 110, server device 120, TCE 310, and hardware 320. Client device 110, server device 120, TCE 310, and hardware 320 may include the features described above in connection with, for example, one or more of FIGS. 1-6. Components of system 600 may interconnect via wired and/or wireless connections, such as via communication channels 130. A single client device 110, server device 120, TCE 310, and hardware 320 have been illustrated in FIG. 7 for simplicity. In practice, system 700 may include more client devices 110, server devices 120, TCEs 310, and/or hardware 320.

As further shown in FIG. 7, client device 110 may include hardware 710 (e.g., an embedded processor). Hardware 710 may include the features described above in connection with hardware 320. In one example implementation, system 700 may include more than one master and slave relationship, such as a chain of master and slave devices. For example, as shown in FIG. 7, TCE 310 may act as a master device 720 and may execute a process on hardware 710. Hardware 710 may be considered a slave device 730 with respect to master device 720 (e.g., TCE 310). However, hardware 710 may be considered a master device 730 with respect hardware 320, which may be considered a slave device 740 with respect to master device 730 (e.g., hardware 710). Master device 730 (e.g., hardware 710) may execute a portion of the process on slave device 740 (e.g., hardware 320). In one example, communication channel 130, between TCE 310 and hardware 710, may be an Ethernet (or any other protocol) based communication channel, and communication channel 130, between hardware 710 and hardware 320, may be a PCI (or any other protocol) based communication channel. In one example implementation, the master and slave relation may be dynamic. For example, a master device may give up master rule and may become a slave device, and a slave device may become a master device during a simulation.

Example Processes

Figure 8:
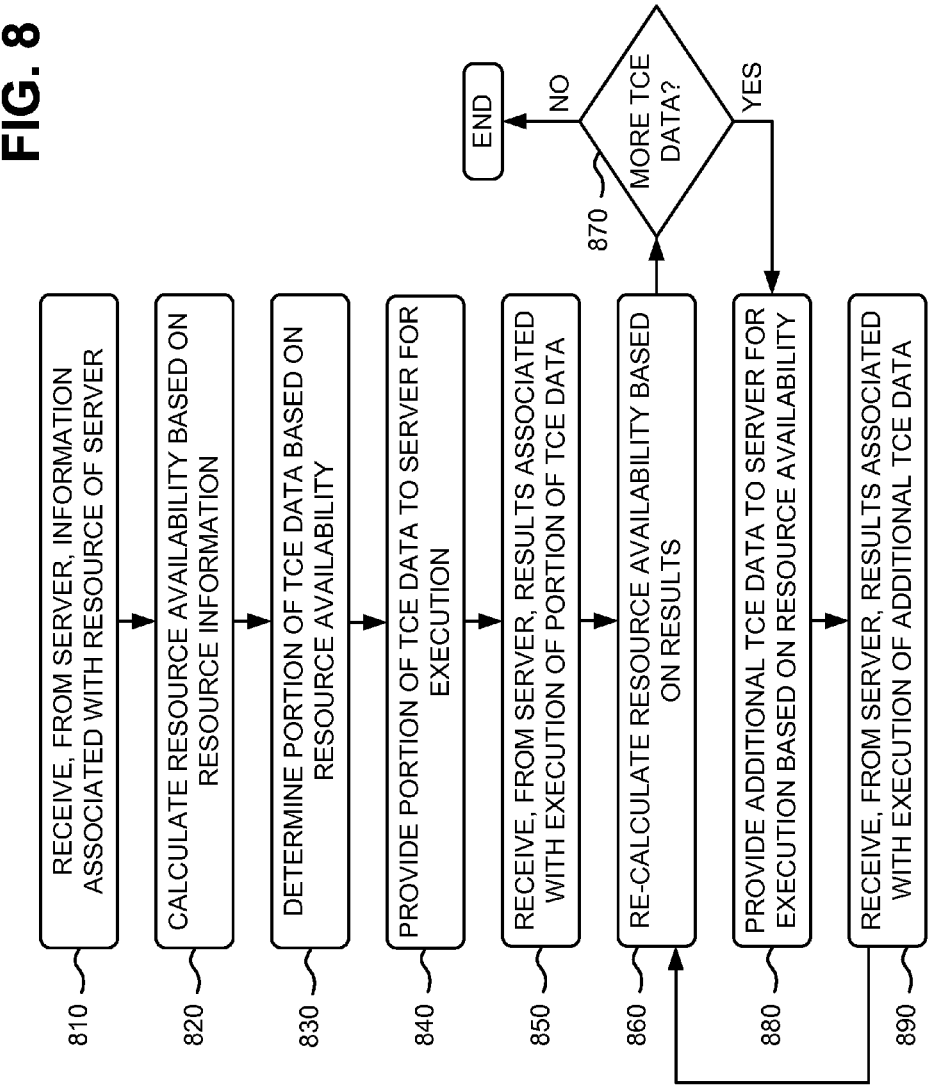
FIG. 8 is a flow chart of an example process for performing dynamic arbitrary data simulation using fixed resources according to an implementation described herein.

FIG. 8 is a flow chart of an example process for performing dynamic arbitrary data simulation using fixed resources according to an implementation described herein. In one implementation, process 800 may be performed by client device 110/TCE 310. In other implementations, process 800 may be performed by another device or a group of devices separate from or including client device 110/TCE 310.

As shown in FIG. 8, process 800 may include receiving, from a server, information associated with a resource of the server (block 810), and calculating a resource availability based on the resource information (block 820). For example, in an implementation described above in connection with FIG. 5, server device 120 may provide, to client device 110/TCE 310, information 510 associated with a resource (e.g., hardware 320 and/or transaction level simulator 330) of server device 120. Information 510 may include a capacity of hardware 320, a percent utilization of hardware 320, a capacity of transaction level simulator 330, a percent utilization of transaction level simulator 330, etc. Client device 110/TCE 310 may receive information 510, and may calculate a resource availability based on information 510.

As further shown in FIG. 8, process 800 may include determining a portion of TCE data based on the resource availability (block 830), and providing the portion of the TCE data to the server for execution (block 840). For example, in an implementation described above in connection with FIG. 5, client device 110/TCE 310 may determine initial amount 520 of the TCE data based on the resource availability. For example, if information 510 indicates that zero percent of hardware 320 is being utilized, client device 110/TCE 310 may determine that hardware has one-hundred percent availability. Client device 110/TCE 310 may then determine what initial amount 520 of the TCE data may be handled by the fully available hardware 320. Client device 110/TCE 310 may provide initial amount 520 of the TCE data to server device 120 for executing or processing by hardware 320 and/or transaction level simulator 330.

Returning to FIG. 8, process 800 may include receiving, from the server, results associated with execution of the portion of the TCE data (block 850), and re-calculating the resource availability based on the results (block 860). For example, in an implementation described above in connection with FIG. 5, client device 110/TCE 310 may receive, from server device 120, results 530 associated with executing or processing initial amount 520 of the TCE data, and may recalculate the resource availability based on results 530.

As further shown in FIG. 8, process 800 may include determining whether there is additional TCE data (block 870). If there is additional TCE data (block 870—YES), process 800 may include providing the additional TCE data to the server for execution based on the resource availability (block 880), receiving, from the server, results associated with execution of the additional TCE data (block 890), and returning to process block 860. Otherwise (block 870—NO), process 800 may end. For example, in an implementation described above in connection with FIG. 5, client device 110/TCE 310 may determine whether there is additional TCE data 540 to provide to server device 120 for executing or processing. If there is additional TCE data 540, client device 110/TCE 310 may provide additional TCE data 540 to server device 120 for executing or processing by hardware 320 and/or transaction level simulator 330. Client device 110/TCE 310 may receive, from server device 120, additional results 550 associated with executing or processing additional TCE data 540. Client device 110/TCE 310 may recalculate the resource availability based on additional results 550, and may repeat the aforementioned process until there is no more additional TCE data.

Figure 9:
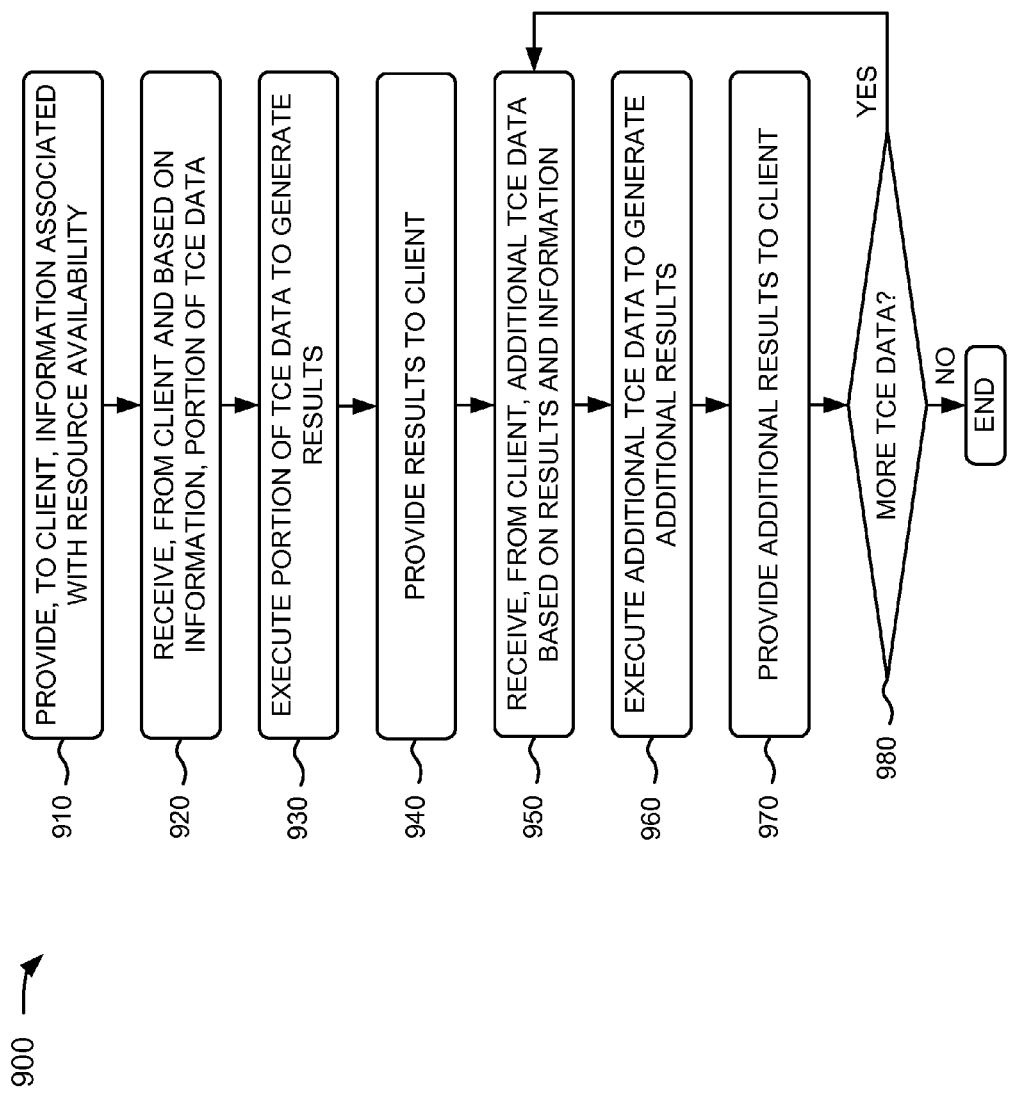
FIG. 9 is a flow chart of another example process for performing dynamic arbitrary data simulation using fixed resources according to an implementation described herein.

FIG. 9 is a flow chart of another example process 900 for performing dynamic arbitrary data simulation using fixed resources according to an implementation described herein. In one implementation, process 900 may be performed by server device 120. In other implementations, process 900 may be performed by another device or a group of devices separate from or including server device 120.

As shown in FIG. 9, process 900 may include providing, to a client, information associated with a resource availability (block 910), and receiving, from the client and based on the information, a portion of TCE data (block 920). For example, in an implementation described above in connection with FIG. 5, server device 120 may provide, to client device 110/TCE 310, information 510 associated with a resource (e.g., hardware 320 and/or transaction level simulator 330) of server device 120. Information 510 may include a capacity of hardware 320, a percent utilization of hardware 320, a capacity of transaction level simulator 330, a percent utilization of transaction level simulator 330, etc. Client device 110/TCE 310 may determine initial amount 520 of the TCE data based on the resource availability. Client device 110/TCE 310 may provide initial amount 520 of the TCE data to server device 120 for executing or processing by hardware 320 and/or transaction level simulator 330. Server device 120 may receive initial amount 520 of the TCE data.

As further shown in FIG. 9, process 900 may include executing the portion of the TCE data to generate results (block 930), and providing the results to the client (block 940). For example, in an implementation described above in connection with FIG. 5, hardware 320 and/or transaction level simulator 330 may execute or process initial amount 520 of the TCE data to generate results 530 associated with executing or processing initial amount 520 of the TCE data. Server device 120 may provide results 530 to client device 110/TCE 310.

Returning to FIG. 9, process 900 may include receiving, from the client, additional TCE data based on the results and the information (block 950), and executing the additional TCE data to generate additional results (block 960). For example, in an implementation described above in connection with FIG. 5, server device 120 may receive additional TCE data 540, and hardware 320 and/or transaction level simulator 330 may execute or process additional TCE data 540 to generate additional results 550 associated with executing or processing additional TCE data 540.

As further shown in FIG. 9, process 900 may include providing the additional results to the client (block 970), and determining whether there is additional TCE data (block 980). If there is additional TCE data (block 980—YES), process 900 may return to process block 950. If there is no additional TCE data (block 980—NO), process 900 may end. For example, in an implementation described above in connection with FIG. 5, server device 120 may provide additional results 550 to client device 110/TCE 310. Client device 110/TCE 310 may receive, from server device 120, additional results 550 associated with executing or processing additional TCE data 540. Client device 110/TCE 310 may recalculate the resource availability based on additional results 550, and may repeat the aforementioned process until there is no more additional TCE data.

CONCLUSION

Systems and/or methods described herein may provide a mechanism to send arbitrarily sized data (e.g., arbitrary vector size data, arbitrary matrix size data, etc.), associated with a model or a design, from a client device (e.g., executing a technical computing environment (TCE)) to one or more server devices (e.g., a CPU, a GPU, a FPGA, etc.) without recompiling or re-synthesizing the model at the client device. The systems and/or methods may enable this by keeping the model fixed and by dynamically utilizing resources in the server device via the client device. The systems and/or methods may enable a user (e.g., of the client device) to synthesize the model and to dynamically change the size of the data for the model during simulation by the server device, without having to recompile or re-synthesize the model at the client device. For example, the systems and/or methods may provide portions of TCE data for processing by the service device based on the availability of the resources in the server device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   determining a first amount of data to provide to a server device for execution based on an initial availability of a resource of the server device,
   determining the first amount of data being performed by a device;
   providing the first amount of data to the server device for execution,
   providing the first amount of data being performed by the device;
   receiving, from the server device, first results associated with execution of the first amount of data,
   receiving the first results being performed by the device;
   calculating an availability of the resource of the server device based on the first results associated with execution of the first amount of data,
   calculating the availability of the resource being performed by the device;
   providing, to the server device for execution, a second amount of data based on the availability of the resource of the server device,
   providing the second amount of data being performed by the device; and
   receiving, from the server device, second results associated with execution of the second amount of data,
   receiving the second results being performed by the device.

2. The method of claim 1, further comprising:
   receiving information associated with the resource of the server device; and
   calculating the initial availability of the resource based on the information associated with the resource.

3. The method of claim 1, further comprising:
   determining, prior to providing the second amount of data, that additional data has been generated by a technical computing environment (TCE) program for execution by the server device.

4. The method of claim 1, further comprising:
   re-calculating the availability of the resource based on the second results associated with execution of the second amount of data;
   determining whether further data is generated by a technical computing environment (TCE) program;
   providing, when the further data is generated by the TCE program, the further data to the server device for execution; and
   receiving, from the server device, third results associated with execution of the further data.

5. The method of claim 1, where the first amount of data includes vector data or matrix data.

6. The method of claim 1, where the server device includes one of a central processing unit (CPU), a graphical processing unit (GPU), a field-programmable gate array (FPGA), or an application-specific integrated circuit (ASIC).

7. The method of claim 1, where the server device includes a transaction level simulator.

8. The method of claim 3, where the TCE program includes one of:
   a LabView application,
   a LabView-compatible application,
   a Simulink application,
   a MATLAB application using functions, or
   a MATLAB application using system objects.

9. The method of claim 1, where the first amount of data includes one of:
   a system object generated by a technical computing environment (TCE) program, or
   a LabView data structure.

10. A device, comprising:
    a processor to:
       receive information associated with a resource of a server device,
       calculate an initial resource availability based on the information associated with the resource,
       determine, based on the initial resource availability, a first amount of data to provide to the server device for execution,
       provide the first amount of data to the server device for execution,
       receive, from the server device, first results associated with execution of the first amount of data,
       calculate an availability of the resource based on the first results associated with execution of the first amount of data,
       provide, to the server device for execution, a second amount of data generated by the TCE program based on the availability of the resource of the server device, and
       receive, from the server device, second results associated with execution of the second amount of data.

11. The device of claim 10, where the processor is further to:
    determine, prior to providing the second amount of data, that a technical computing environment (TCE) program generated the second amount of data for execution by the server device.

12. The device of claim 10, where the processor is further to:
re-calculate the availability of the resource based on the second results associated with execution of the second amount of data;
determine that a third amount of data generated by a technical computing environment (TCE) program remains for execution by the server device,
provide, based on determining that the third amount of data generated by the TCE program remains, the third amount of data to the server device for execution, and
receive, from the server device, third results associated with execution of the third amount of data.

13. The device of claim 10, where the first amount of data includes vector data or matrix data.

14. The device of claim 10, where the server device includes one of a central processing unit (CPU), a graphical processing unit (GPU), a field-programmable gate array (FPGA), an application-specific integrated circuit (ASIC), or a transaction level simulator.

15. One or more non-transitory computer-readable media storing instructions, the instructions comprising:
one or more instructions that, when executed by a processor of a device, cause the processor to:
identify a first amount of data to provide to a server device for execution based on an initial availability of a resource of the server device,
provide the first amount of data to the server device for execution,
receive, from the server device, first results associated with execution of the first amount of data,
calculate an availability of the resource based on the first results associated with execution of the first amount of data,
determine that a second amount of data remains for execution by the server device,
provide, based on determining that the second amount of data remains, the second amount of data to the server device for execution, and
receive, from the server device, second results associated with execution of the second amount of data.

16. The one or more non-transitory computer-readable media of claim 15, further comprising:
one or more instructions that, when executed by the processor, cause the processor to:
receive information associated with the resource of the server device, and calculate the initial availability of the resource based on the information associated with the resource.

17. The one or more non-transitory computer-readable media of claim 15, where the first amount of data includes vector data or matrix data.

18. The one or more non-transitory computer-readable media of claim 15, where the server device includes one of a central processing unit (CPU), a graphical processing unit (GPU), a field-programmable gate array (FPGA), an application-specific integrated circuit (ASIC), or a transaction level simulator.

19. A method, comprising:
providing, by a device and to a client device, information associated with an availability of a resource of the device;
receiving, by the device, a first amount of data after the client device determines the first amount of data to provide to the device for execution based on the information associated with the availability of the resource;
executing, by the device, the first amount of data to generate first results;
providing, by the device, the first results to the client device;
receiving, by the device, a second amount of data based on the first results;
executing, by the device, the second amount of data to generate second results; and
providing, by the device, the second results to the client device.

20. The method of claim 19, where the first amount of data includes vector data or matrix data.

21. The method of claim 19, where the device includes one of a central processing unit (CPU), a graphical processing unit (GPU), a field-programmable gate array (FPGA), or an application-specific integrated circuit (ASIC).

22. The method of claim 19, where the device includes a transaction level simulator.

23. A device, comprising:
a processor to:
provide, to a client device, information associated with an availability of a resource of the device,
receive, based on the information, a first amount of data after the client device determines the first amount of data to provide to the device for execution based on the information associated with the availability of the resource,
execute the first amount of data to generate first results,
provide the first results to the client device,
receive, from the client device and based on the first results, a second amount of data,
execute the second amount of data to generate second results, and
provide the second results to the client device.

24. The device of claim 23, where the first amount of data includes vector data or matrix data.

25. The device of claim 23, where the processor includes one of a central processing unit (CPU), a graphical processing unit (GPU), a field-programmable gate array (FPGA), or an application-specific integrated circuit (ASIC).

26. The device of claim 23, where the device includes a transaction level simulator.

27. One or more non-transitory computer-readable media storing instructions, the instructions comprising:
one or more instructions that, when executed by a processor of a device, cause the processor to:
provide, to a client device, information associated with an availability of a resource of the device,
receive, based on the information, a first amount of data after the client device determines the first amount of data to provide to the device for execution based on the information associated with the availability of the resource,
execute the first amount of data to generate first results,
provide the first results to the client device,
receive, from the client device and based on the first results, a second amount of data,
execute the second amount of data to generate second results, and
provide the second results to the client device.

28. The one or more non-transitory computer-readable media of claim 27, where the first amount of data includes vector data or matrix data.

29. The one or more non-transitory computer-readable media of claim 27, where the device includes one of a central processing unit (CPU), a graphical processing unit (GPU), a field-programmable gate array (FPGA), or application-specific integrated circuit (ASIC), or a transaction level simulator.

30. The one or more non-transitory computer-readable media of claim 27, where the information associated with the availability of the resource includes one of:
   a percent utilization of hardware, or
   a capacity of a transaction level simulator.

\* \* \* \* \*